3,479,189
BAKING AUXILIARY

Carl Vrang, Skade per Hojbjerg, Niels Krog, Brabrand, and Jens Birk Lauridsen, Horret per Marslet, Denmark, assignors to Aktieselskabet Grendstedvaerket, Arhus, Denmark
No Drawing. Filed May 12, 1965, Ser. No. 455,325
Claims priority, application Great Britain, May 15, 1964, 20,357/64
Int. Cl. A21d *13/08, 13/00;* A23d *5/00*
U.S. Cl. 99—118                                          6 Claims

ABSTRACT OF THE DISCLOSURE

A baking auxiliary for use in sugar-containing bakery products containing glycerol monoesters of saturated fatty acids and propylene glycol monoesters of saturated fatty acids and water, the weight proportions of glycerol monoester to propylene glycol monester being 65–75 to 35–25 together with 20–60% water and 10–40 percent of selected organic liquids as solvent and 1–8% of co-emulsifier.

---

The present invention relates to a baking auxiliary on the basis of concentrated glycerol monoesters of saturated fatty acids and concentrated propylene glycol monoesters of saturated fatty acids, and water. The baking auxiliary is particularly meant for use in the preparation of sugar-containing bakery products, both bakery products poor in or free of fats or oils, such as foam type cakes, sponge cakes and other sweet cakes, and fat- or oil-containing cakes such as Madeira-cakes.

In preparing batters or baking-mixes for baking bread, cakes and other farinaceous bakery products it is well-known practice to use baking auxiliaries such as emulsifying compositions of various kinds, and as an active component in such baking auxiliaries it is also known to use partial esters of glycerol, particularly monoesters or predominantly monoesters. Especially in the preparation of cakes from batter or mixes with a high content of sugar, both with a small or no content of fats or oils (triglycerides) and with higher contents of fats or oils, the use of monoglycerides is particularly desirable because they yield light batters and have the ability of imparting to the baked product a large volume and a good structure, i.e. a structure with a large total pore volume or void volume composed of numerous evenly distributed, uniform small pores, and the monoglycerides also impart to such cakes or bakery products softness and tenderness and altogether desirable properties. The monoglycerides have good water-binding properties and therefore keep the cakes fresh for a long period of time, and for the same reason it is possible in a batter containing monoglycerides as baking auxiliary to use a smaller amount of eggs than is necessary in other cases.

However, the use of monoglycerides presents problems. Originally they were used in a fairly low concentration, for instance 30–40% calculated on the weight of the emulsifier, the balance being made up of diglycerides, a little triglyceride and possibly a small amount of free glycerol. The unconcentrated monoglycerides do not present big problems but their ability to give big volume of batter and cake is unsatisfactory. Nowadays one therefore in an increasing degree uses the monoglycerides in a more, preferably strongly concentrated form in a concentration of from 70 or usually 80% up to about 99%, most commonly about 90% of monoglyceride, the balance still being diglycerides, triglycerides and possibly a little free glycerol. Such concentrated, usually distilled monoglycerides present a major problem since they occur in different polymorphic crystal forms. When the concentrated monoglycerides are caused to solidify from the molten condition they are substantially obtained in a thermodynamically unstable so-called α-crystal form. In the α-crystal form the monoglycerides are extremely effective as emulsifiers and very suitable as baking auxiliaries, for the preparation of ice cream, whipped cream and many other products since as stated they impart to bakery products a large volume with small, evenly distributed pores, and they also contribute well to preserve the water content of for instance a cake which thereby is kept fresh for a prolonged period of time.

By standing, however, the crystals rapidly, usually in a few days, are converted into a thermodynamically stable so-called β-crystal form which is not active as a baking auxiliary, has no emulsifying effect and therefore without another recrystallisation is unusable as baking auxiliary. Furthermore, the concentrated monoglycerides have the disadvantage that they are difficultly dispersed in water at a low temperature. When using them it is therefore necessary in practice to disperse them in water within a rather narrow temperature interval, for instance 68–70° C. for a monoglyceride mixture with the same fatty acid composition as in fully hardened ox tallow, i.e. about 60% stearic acid and 40% palmitic acid. In bakery practice it is inconvenient to be bound to such narrow temperature intervals, and since in practice one cannot employ the monoglycerides in a dry mixture with the other components of the baking mix or batter, i.e. because in that case it is difficult to obtain the stabilizing effect on the batter, it is necessary to distribute the monoglycerides in a suitable medium prior to admixing them with the other components of the batter.

In the specifications to the U.S.A. Patents Nos. 3,034,897 and 3,034,898 it has been proposed to stabilize the α-crystal form of the concentrated monoglycerides by incorporating the latter in conjoined crystals with monoesters of propylene glycol (1,2-propanediol; 1,3-propanediol monoesters do not appear to be effective), the conjoined crystal being obtained by rapid and concurrent crystallisation of the two ester types, the two types being present in the conjoined crystals in a proportion of 35–60 mole percent of glycerol monoester and 40–65 mole percent of propyleneglycol monoester; furthermore, the fatty acid moieties should substantially, i.e. at least 75 mole percent and preferably at least 90 mole percent should be identical in the two ester types. In such a composition the monoglycerides retain their α-crystal form for a long period of time and the composition is very suitable for use as a baking auxiliary, especially for sugar-containing cakes poor in fats-content or not containing added fats or oils at all. In practice the said composition is used in the form of aqueous dispersions and these have a long shelf-life in so far as the α-crystal form and thereby the properties as emulsifier and baking auxiliary are preserved. Yet in practice it seems as if it is necessary to stir the dispersion vigorously with water immediately prior to its use if it has been kept for a relatively long period of time. The aqueous dispersion, in which the two ester types are still present in the form of conjoined crystals, also seems rather difficult to prepare in a satisfactory quality and in practice it must be formed at an elevated temperature, for instance by melting the crystals and pouring them into water having a temperature slightly below that of the melting point of the ester mixture.

A more serious disadvantage of the said composition of conjoined crystals of the two esters is, however, that by using them it is necessary to use a larger amount of ester than is really necessary. The preparations of monoesters of propylene glycol and of glycerol are largely identical and the cost is largely the same. Since only the glycerol monoesters are active as emulsifiers or baking auxiliaries, whereas the propylene glycol monoesters are essentially inactive in these respects and only act as crystal form stabilisers, the comparatively large amount thereof, i.e. preferably the same amount as the monoglycerides or possibly somewhat more, enhances the costs of using this agent more than desirable. It has now been found that these costs may be cut down, and that furthermore a somewhat more effective agent can be obtained by limiting the amount of propyleneglycol monoester, whereby it becomes possible to obtain a better effect with a smaller amount of baking auxiliary than is possible by using the conjoined crystals. It is the purpose of the invention to provide a composition, in the form of a paste, having this effect.

It is desirable to employ such baking auxiliaries in the form of paste-like compositions, but in former attempts at preparing pastes which as the baking-active, batter-stabilising or emulsifying substance contain concentrated monoglycerides, the difficulties described with respect to retaining the α-crystal form have been found to prevent the preparation of a paste having satisfactory ability to keep more than a few weeks and furthermore they have the disadvantage that the concentrated monoglycerides, when an aqueous paste is being formed, have a tendency to attract a definite amount of water, whereby jelly lumps are formed which are difficult to distribute evenly in the entire medium. It is the purpose of the invention to remedy also this inconvenience.

According to the invention it has been found that the above aims can be achieved by a baking auxiliary which as its essential components contains concentrated glycerol monoesters of saturated fatty acids with 12–24 carbon atoms in predominantly α-crystal form and concentrated propyleneglycol monoesters of saturated fatty acids with 12–24 carbon atoms in a weight ratio from 75:25 to 65:35 and a total amount of 10–40% of the total weight of the auxiliary, and a co-emulsifier in a medium containing one or more liquid, edible alcohols, liquid, edible esters of such alcohols or aqueous sorbitol, and water; said co-emulsifier comprises at least one compound selected from the group consisting of alkali metal salts of fatty acids, partial esters of fatty acids with polyglycerols, partial esters of fatty acids with penta and hexohydric alcohols and inner ethers of penta and hexahydric alcohols and esters of fatty acids of polyoxyethylene sorbitans.

By concentrated glycerol monoesters such esters are understood which contain at least 80% and preferably 90% or more of the monoester or monoesters. The term "propylene glycol monoesters" has the analogous meaning.

Such a composition is paste-like and excellently suitable as a baking auxiliary. It is easily mixed uniformly witth the other components of a batter or baking mix and makes the batter light, and it is very suitable for sweet cakes poor in or free from added fats or oils, as well as for sweet, fat- or oil-containing cakes. Such cakes prepared by aid of the described paste are voluminous and keep their freshness for a long period of time, i.e. they maintain the moisture content well. They have a good pore structure, i.e. a large total volume with a large total pore volume of small, uniform, evenly distributed pores. Details hereon will appear from the examples. Furthermore, the composition has the considerable advantages that it can be used in a fairly small amount and nevertheless gives a completely satisfactory result. Especially the necessary amount of ester (monoglyceride and propylene glycol monoester) hereby becomes comparatively low; on the other hand, a certain amount of organic solvents is used, but these are much cheaper than the esters. It seems as if one part of ester gives the same or a somewhat better result when preparing sweet, non-fatty cakes of the types mentioned as does about three parts of ester when using an aqueous dispersion of conjoined crystals as described. Details hereon will appear from the examples.

The composition has an excellent shelf-life as will appear from the experiment described below. Two different baking auxiliaries were prepared with the following compositions (expressed in percent by weight):

|  | 1 | II |
|---|---|---|
| Distilled, 90% monoglycerides (α-crystal form) | 18 | 30 |
| Distilled, 90% propylene glycol monoester | 12 | 0 |
| Glycerol | 10 | 10 |
| Propylene glycol (1,2-propanediol) | 10 | 10 |
| Potassium stearate (co-emulsifier) | 1 | 1 |
| Water | 49 | 49 |

In both cases, the fatty acid moiety in the esters comprised 60% of stearic acid and about 40% of palmitic acid (composition as in hardened ox tallow), and in so far experiment I is concerned it was the same in both ester types. In experiment I, the composition of the baking auxiliary thus was in accordance with the invention, whereas in experiment II it only contained monoglyceride as the ester component. In both cases the paste was prepared thereby that the components were mixed under slow stirring and heating at 75–80° C. until the mixture was homogeneous, after which it was slowly cooled under stirring to 60–75° C. and poured into a number of containers in which by standing at room temperature it was slowly cooled to room temperature.

From the various portions batters or baking-mixes were prepared either immediately or after storing for various periods of time, and the volumes of these batters were measured. The composition of the batters was in all cases:

| | Grammes |
|---|---|
| Baking auxiliary (I or II) | 20 |
| Cold water | 100 |
| Sugar | 150 |
| Whole eggs | 150 |
| Wheat flour | 225 |
| Baking powder | 5 |

The ingredients were mixed and whipped for three minutes. The weight of the various batters were, in grammes per litre:

| Batter prepared by baking auxiliary stored for number of months | Baking auxiliary I; g./l. | Baking auxiliary II, g./l |
|---|---|---|
| 0 | 408 | 320 |
| 1 | 400 | 380 |
| 2 | 406 | 450 |
| 4 | 402 | 600 |
| 8 | 420 | 970 |

Thus it will be seen that baking auxiliary II, i.e. without propylene glycol monoester, has a better effect, gives a less heavy batter when used freshly prepared than has baking auxiliary I, but that the effect decreases rather quickly, whereas baking auxiliary I maintains its effect almost unaltered for a long period of time. The decreasing effect of baking auxiliary II is due to recrystallisation of the monoglycerides into the β-crystal form; it is in fact possible to follow this recrystallisation visually, because the freshly prepared paste is in both cases limpid and homogeneous to the naked eye, which appearance paste I retains, whereas baking auxiliary II gradually attains a cloudy, yellowish-milky, fatty appearance. It should be added that a shelf-life of at least 6 months and sometimes more is usually desirable for commercial and technical reasons.

The exact mechanism of the effect of the composition of the invention is not known and the physical condition of the various components of the composition is not clear. Since it is possible to prepare the paste at an elevated temperature and slow cooling, it is supposed that the two ester types crystallise separately and are present in a sort of dispersed condition in the medium, possibly partly dissolved in its organic component or components.

In fact, when the invention was first made it was assumed that the two ester types crystallised separately and formed crystals of different appearances, the crystals of the monoglycerides appearing under a microscope in polarized light as long, needle-shaped ones arranged in a reticular pattern whereas the crystals of the monoesters of propylene glycol were believed to be arranged in small circles or ball-like structures, no long needles being present. The ball-like structures in a paste not containing monoglycerides melted at 38–40° C. whereas the needle-shaped structures in a paste not containing monoesters of propylene glycol melted or were dissolved at about 50–52° C. It was also then believed that it was essential for the effect of the paste that it was cooled slowly after the mixing of the ingredients at elevated temperatures, so as to retain the two types of crystal arrangement separately in the paste.

In the course of the further investigations it has not been possible to confirm this theory. In a paste containing both types of esters, both "needles" and "balls" are present, earlier believed to originate from the respective ester types. It has been found, however, that the "needles" in such paste, containing both ester types, melt or are dissolved at a lower temperature than the "balls." It has not been possible to explain this fact. Recent investigations have furthermore shown that the "balls" are not present in a paste containing monoglyceride:propylene glycol monoester in the proportion 75:25, whereas they are abundantly present when the said proportion is 60:40. Thus, the presence of the "balls" appear to be dependent on the concentration of propylene glycol monoester and may conceivably be explained as the formation of an emulsion-like structure (a paste only containing propylene glycol monoesters should in its structure rather be characterised as an emulsion than as a solution). This fact may explain why a paste containing a rather high proportion of propylene glycol monoester has no satisfactory effect.

As fatty acid moiety in the esters may, as stated hereinbefore, be used saturated fatty acids with 12–24, preferably 14–20 carbon atoms and particularly it is preferred to use palmitic and/or stearic acid as the main fatty acid component, especially in the easily accessible composition 40:60 as in fully hardened ox tallow. Unsaturated fatty acids should not be present, or be present only in immaterial amounts, not more than say about 5 percent. The fatty acid composition in the two ester types may preferably be completely or substantially identical, but may also be different.

The two ester types may be present in a weight proportion glycerol monoester:propylene glycol monoester of 75:25 to 65:35. By a lesser content of glycerol monoester the baking effect decreases since as mentioned only the latter constitutes the baking-effective component, and by a lesser content of the propylene glycol monoester the shelf-life of the paste is too short, although the baking effect is quite satisfactory until recrystallisation begins. It has thus been found that a similar paste has unsatisfactory shelf-life if it only contains propylene glycol monoester:monoglyceride in the proportion 10:90, and that the baking effect of the paste already begins to decrease when the composition of the ester mixture propylene glycol monoester:monoglyceride is 40:60. According to the invention it is therefore preferred that the weight ratio of glycerol monoester or monoesters to propylene glycol monoester or monoesters is in the range 75:25 to 65:35.

Part of the baking auxiliary of the invention is a co-emulsifier which notably contributes to disperse and distribute the paste evenly in the other components of batters or baking mixes. It has according to the invention been found that the co-emulsifier conveniently is present in an amount of 1–8% by weight, though smaller or larger amounts may be used; amongst suitable co-emulsifiers are various strongly hydrophilic surfactants. Particularly suitable co-emulsifiers according to the invention are alkali metal salts of fatty acids, partial fatty esters of polyglycols or pentahydric or hexahydric alcohols or so-called "inner" ethers of such alcohols, as well as fatty esters of polyoxyethylene sorbitanes. If desired, two or several co-emulsifiers may be present in the same paste, for instance, 1–3 parts of potassium or sodium salt of a fatty acid such as oleic acid per 3–1 parts of sorbitane tristearate. Normally, 3–4% of co-emulsifier, based on the weight of the paste is a suitable amount thereof.

The organic medium seems to be of great importance for the present baking auxiliary and is possibly the component that ensures a permanent intimate contact between the two ester types, which contact again conceivably is the reason for the prolonged shelf-life of the composition, i.e., responsible for the fact that the recrystallisation from α-crystal for to β-crystal form does not take place, and the reason why the paste may be easily dispersed in water without forming jelly lumps of limited size. On the other hand, the kind of organic solvent does not seem to be very critical. Especially it is preferred to use propylene glycol (1,2-propanediol) alone or together with glycerol. According to the invention, the most suitable liquid edible alcohols or liquid, edible esters thereof are propylene glycol, glycerol, ethanol, aqueous sorbitol and glycerol partially or completely esterified with acetic acid or propionic acid, or a mixture of two or more of these solvents, in a total amount of from 10 to 40%, calculated on the weight of the baking auxiliary. With the expression "liquid," alcohols and esters are meant which are liquid at room temperature. It has been found, however, that highly concentrated aqueous sorbitol containing a crystal inhibitor such as a starch hydrolysate or mannitol in this connection should be considered as completely equivalent to a liquid alcohol, and it is therefore considered as belonging to this group of compounds irrespective of the fact that sorbitol is solid at room temperature. Aqueous sorbitol in a concentration of about 65–75% and containing a crystal inhibitor is stable and well suitable for being used as the alcohol component or part thereof in the present baking auxiliary.

The water content of the auxiliary may vary somewhat depending on the content of the other components and the desired consistency of the paste. It usually amounts to 20–60%, most often about 40%, calculated on the weight of the paste.

Accordingly, a baking auxiliary of the invention ordinarily has the following composition, expressed in percent by weight:

| | |
|---|---|
| Mixture of monoglyceride (predominantly α-crystal form) and propylene glycol monoester in proportion 75:25–65:35 | 10–40%, preferably about 30%. |
| Liquid alcohol or ester (preferably 10% propylene glycol, ethanol or mono-, di- or triacetin and 10% glycerol, or 70%-aqueous sorbitol containing crystal inhibitor) | 10–40%, preferably about 20%. |
| Co-emulsifier, for instance soap, sorbitan tristearate or sorbitan-polyoxyethylene-fatty ester | 1–8%, preferably about 4%. |
| Water | 20–60%, preferably about 46%. |

The paste may also contain flavouring or colouring matter, if desired.

The composition may be used as baking auxiliary in many types of bakery products such as for instance bread in the form of loaves, rolls, buns and cakes and is particularly suitable for preparing sugar-containing products poor in or free from added fats or oils, such as foam type cakes or sponge cakes, or sweet, fat- or oil-containing cakes such as for instance Madeira-cakes. The paste is easily distributed in the other components of the batter or baking mix and usually employed therein in an amount up to a few percent, for instance from 0.5 up to 5 percent, and preferably some 1–3% based on the weight of the batter.

The composition may be prepared by simple mixing of the ingredients, usually while stirring, at a temperature above the melting point of the monoglycerides and subsequent cooling. The cooling may take place rapidly, for instance in a heat exchanger of any desired type, or more slowly, for instance by being left standing at room temperature. For instance it is possible to proceed in the manner that one first mixes one or more concentrated glycerol monoesters of saturated fatty acids with 12–24 carbon atoms and one or more propylene glycol monoesters of fatty acids with 12–24 carbon atoms in a proportion of 85:15–60:40, preferably 75:25–65:35 under slow stirring, thereupon adds one or more liquid, edible alcohols or liquid, edible esters thereof or aqueous sorbitol, and water, heats the mixture while stirring to a temperature of 75–80° C. and continues slow stirring at this temperature until the mixture is homogeneous. Thereupon, the mixture thus formed is cooled, for instance by standing at room temperature, possibly after an initial somewhat rapid cooling to for instance about 45° C.

The baking auxiliary according to the invention and its effect in sugar-containing batters poor in fats content in the following will be illustrated more fully with reference to some experiments and examples which should not be construed to limit the scope of the invention. Percentages are always percent by weight.

EXAMPLE 1

| | |
|---|---|
| Ester mixture (see below) | 30 |
| Propylene glycol | 10 |
| Glycerol | 10 |
| Co-emulsifier, equal parts of potassium oleate and sorbitane-tristearate | 4 |
| Water | 46 |

The ingredients were mixed and heated under stirring at 75–80° C. until the mixture was homogeneous, whereafter it was cooled at 45° C. in a heat-exchanger of the pipe-coil type, after which it was finally left standing at room temperature to be cooled to room temperature.

The ester mixture consisted of 90% glycerol monoester of fatty acids in predominantly α-crystal form and, except one series of experiments, 90% propylene glycol monoesters of fatty acids, in varying proportions (to be seen from Table 1 below). In both cases the fatty acid moieties were as in fully hardened ox tallow, i.e. about 60% stearic acid and about 40% palmitic acid. The compositions thus prepared were pastes and were used after various periods of storing for preparing batters for sponge type cakes and of the following composition:

| | Grammes |
|---|---|
| Sugar | 200 |
| Whole eggs | 235 |
| Cold water | 100 |
| Paste (as above) | 24 |
| Wheat flour | 160 |
| Starch | 75 |
| Baking powder | 4 |

All of the ingredients of the batter were admixed with one another simultaneously and the entire mix was in each experiment whipped for three minutes in an ordinary household stirring machine at highest speed. The ability of the mix to be whipped up was determined by measurement of the volume of the batter. Subsequently the batter was baked at about 200° C. for 15–20 minutes. After baking and cooling, the volume of the sponge type cake was measured and its structure, i.e. pore size, pore distribution and evenness of pores was assessed visually according to an arbitrary scale as follows:

| | |
|---|---|
| Tolerably good | + |
| Good | ++ |
| Extremely good | +++ |

In Table I below the results are shown of experiments with the stated composition and varying proportions of the two types of esters, after various periods of storage of the pastes. In each experiment the results for at least two of the three assessed properties are shown, i.e.: (a) volume of batter expressed in grammes per litre; (b) structure according to the scale set forth above; (c) the size of the baked cake, expressed in milliliters per kilogram of batter. In the table GMS denotes 90% monoglyceride and PGMS 90% propylene glycol monofatty acid ester.

TABLE 1

| | Proportion GMS PGMS | | | | | | | | |
|---|---|---|---|---|---|---|---|---|---|
| | 100 0 | | | 90 10 | | | 75 25 | | |
| | a | b | c | a | b | c | a | b | c |
| Paste stored for— | G./l. | | Ml./kg. batter | G./l. | | Ml./kg. batter | G./l. | | Ml./kg. batter |
| 1 week | 270 | +++ | 4,600 | | | | 298 | +++ | 4,600 |
| 1 month | 290 | +++ | 4,440 | 316 | +++ | | | | |
| 2 months | 406 | ++ | 3,550 | 474 | ++ | | | | |
| 3 months | 420 | ++ | 2,530 | | | | 324 | +++ | 4,520 |
| 4 months | (¹) | | | 486 | ++ | | | | |
| 5 months | | | | (¹) | | | | | |
| 6 months | | | | | | | | | |
| 8 months | | | | | | | | | |
| 10 months | | | | | | | | | |
| 12 months | | | | | | | | 300 | +++ | 4,740 |

| | Proportion GMS PGMS | | | | | | | | |
|---|---|---|---|---|---|---|---|---|---|
| | 70 30 | | | 65 35 | | | 60 40 | | |
| | a | b | c | a | b | c | a | b | c |
| Paste stored for— | G./l. | | Ml./kg. batter | G./l. | | Ml./kg. batter | G./l. | | Ml./kg. batter |
| 1 week | 290 | +++ | 4,600 | 296 | +++ | 4,570 | 347 | ++ | 4,200 |
| 1 month | 205 | +++ | 4,530 | 284 | +++ | | 304 | ++ | 4,080 |
| 2 months | | | | | | | | | |
| 3 months | | | | 284 | +++ | | | | |
| 4 months | 300 | +++ | 4,200 | 290 | +++ | | | | |
| 5 months | | | | | | | | | |
| 6 months | | | | 306 | ++ | | | | |
| 8 months | | | | | | | 330 | ++ | 3,900 |
| 10 months | | | | 292 | +++ | 4,920 | 340 | ++ | |
| 12 months | | | | | | | 372 | ++ | 3,700 |

¹ Paste is recrystallised.

The table shows that a paste not containing propylene glycol monoester gives excellent results after having been stored for a short period of time, i.e. it gives a low density (high bulk) of the batter, good structure of the cake baked therefrom and a high volume of cake per unit of the batter, but that the paste has rather bad keeping qualities so that the effect already after two months' storing is unsatisfactory; furthermore, the monoglycerides in the paste recrystallise in a few months whereby the paste becomes unusable. The table also shows that a paste with a proportion of monoglyceride to propylene glycol monoester of 60:40 has excellent keeping qualities (long shelf-life) and gives comparatively unaltered results after having been stored for a whole year, but that on the other hand it does not give quite satisfactory volume of batter, not the best structure of the cake and not as great a volume of cake per weight unit of batter as do pastes containing a larger proportion of monoglycerides. If still larger relative amounts of propylene glycol monoesters are employed, the baking results and volume of batter are unsatisfactory.

The table also shows that a relative proportion of monoglycerides to propylene glycol monoesters of 90:10 as well as the paste only containing monoglycerides give good results at the beginning but that such a paste is not storable for a sufficiently long period of time.

The intermediate values, on the other hand, all give both excellent storing ability, a light batter with a small density and a light cake with a large volume relative to the amount of batter used for its preparation.

For comparison, some experiments have been carried out in which an aqueous dispersion, about 1 week old, of equal parts of propylene glycol monoester and monoglycerides (predominantly in $\alpha$-crystal form) was employed instead of the pastes described. It was found that the results were rather different in cases where the dispersion was taken directly from the container, from the cases in which the dispersion was first stirred vigorously with the rest of the water to be used in the batter; the dispersion not thus pre-stirred gives unsatisfactory results, as will appear from Table 2 below. The pre-stirring should be comparatively vigorous and may for instance be carried out by aid of a propeller-stirrer at more than 3000 r.p.m., or in a colloid mill. In these experiments the same recipe for the batter (for foam type cake) was used as in the experiments described above, except for the baking auxiliary, and in two instances the amount of water. The baking auxiliary (the dispersion described) was in all cases a 40% aqueous dispersion, and when 50 or 60 grammes of dispersion were used, only 75 grammes of water (apart from that of the dispersion) were used in the baking mix, instead of the 100 grammes as set out in the recipe above. For the rest, the experiments are carried out as those reported in Table 1, yet the structures of the cakes were not assessed. The results appear from Table 2 below.

TABLE 2

| Amount of dispersion | Dispersion not pre-stirred | | Dispersion pre-stirred | |
|---|---|---|---|---|
| | a | c | a | c |
| | G./l. | Ml./kg. batter | G./l. | Ml./kg. batter |
| 30 g. (12 g. of esters) | 520 | 2,880 | 370 | 3,890 |
| 40 g. (16 g. of esters) | 420 | 3,590 | 350 | 3,940 |
| 50 g. (20 g. of esters) | 390 | 3,720 | 320 | 4,190 |
| 60 g. (24 g. of esters) | 360 | 4,000 | 320 | 4,350 |

From this it will be seen that in order to achieve results which are reasonably comparable with, though somewhat inferior to those obtained with the baking auxiliary according to the invention, it is necessary to use 50–60 grammes of dispersion in the recipe, corresponding to 20–24 grammes of the esters, and that it is necessary to pre-stir the dispersion vigorously with water immediately prior to its use. In contradistinction hereto, when carrying out the experiments reported with the baking auxiliary according to the invention it was only necessary to use a paste containing 30% of esters in an amount of 24 grammes, i.e. 7.2 grammes of esters, and these pastes could be used directly without being pre-stirred.

EXAMPLE 2

The following ingredients were used for a paste which was prepared in the manner described in Example 1:

| | Percent |
|---|---|
| Mixture of monoglycerides (predominantly $\alpha$-crystal form) and propylene glycol monoesters of fatty acids in proportion 75:25; fatty acid composition as in Example 1 | 30 |
| Triacetine | 10 |
| Glycerol | 10 |
| Co-emulsifier as in Example 1 | 4 |
| Water | 46 |

This paste had a similar effect as the one described in Example 1, with proportion of GMS:PGMS of 75:25–65:35.

EXAMPLE 3

| | Percent |
|---|---|
| Mixture of esters as in Example 2 | 30 |
| Ethanol | 8 |
| Glycerol | 10 |
| Co-emulsifier as in Example 1 | 4 |
| Water | 48 |

This paste had a similar effect as that described in Example 2.

We claim:

1. In a baking auxiliary containing at least 80% monoesters of glycerol and saturated $C_{12-24}$ fatty acids substantially in the $\alpha$-crystal form, containing at least 80% monoesters of propylene glycol with saturated $C_{12-24}$ fatty acids, the amount of unsaturated fatty acid residues not exceeding 5% of the total amount of fatty acid residues on the two types of esters, and a co-emulsifier, in a mixed aqueous-organic medium, wherein the improvement comprises employing an amount of glycerol monoesters and propylene glycol monoesters which taken together constitute 10–40% by weight of the baking auxiliary and the weight proportion glycerol monoester to propylene glycol monoester is in the range 65–75 to 35–25, the baking auxiliary containing 20–60% by weight of water, 10–40% by weight of at least one organic solvent selected from the class consisting of liquid edible alcohols, liquid edible esters of such alcohols and aqueous sorbitol containing a crystal inhibitor selected from the class consisting of starch hydrolysates and mannitol, and 1–8% by weight of the co-emulsifier.

2. A baking auxiliary as claimed in claim 1, wherein the organic solvent comprises at least one solvent selected from the class consisting of propylene glycol, glycerol, ethanol, aqueous sorbitol containing a crystal inhibitor selected from the class consisting of starch hydrolysates and mannitol, and glycerol esterified at least partially with an acid selected from the class consisting of acetic and propionic acids.

3. A baking auxiliary as claimed in claim 1, wherein the fatty acid moieties in the glycerol monoester and the propylene glycol monoester are moieties of fatty acids with 16–20 carbon atoms.

4. A baking auxiliary as claimed in claim 1, wherein the fatty acid moieties in the glycerol monoester and the propylene glycol monoester are those of fully hydrogenated ox tallow.

5. A baking auxiliary as claimed in claim 1, containing about 30% by weight of the mixture of glycerol monoester and propylene glycol monoester in the weight proportion about 75:25, about 10% by weight of a propylene glycol, about 10% by weight of glycerol, about 4% of at least one co-emulsifier selected from the class consisting of alkali metal salts of fatty acids and sorbitan tristearate, and about 46% of water.

6. A baking auxiliary as claimed in claim 1 wherein the co-emulsifier is selected from the class consisting of alkali metal salts of fatty acids, partial esters of fatty acids with polyglycerols, partial esters of fatty acids with penta- and hexahydric alcohols and inner ethers of penta- and hexahydric alcohols, and esters of fatty acids with polyoxyethylene sorbitans.

References Cited

UNITED STATES PATENTS

| | | | |
|---|---|---|---|
| 2,508,393 | 5/1950 | Jaeger | 99—92 XR |
| 3,034,897 | 5/1962 | Kuhrt et al. | 99—91 |
| 3,034,898 | 5/1962 | Kuhrt et al. | 99—91 |
| 3,268,337 | 8/1963 | Howard et al. | 99—92 |

OTHER REFERENCES

Eastman Kodak Company, Distillation Products Industries Division; article entitled "Monoglyceride Gels," Nov. 13, 1956, pp. 7 to 9.

RAYMOND N. JONES, Primary Examiner

U.S. Cl. X.R.

99—86, 91, 92